(12) United States Patent
Shinozaki et al.

(10) Patent No.: US 8,172,446 B2
(45) Date of Patent: May 8, 2012

(54) LIGHT EMITTING DEVICE AND SURFACE LIGHT SOURCE DEVICE

(75) Inventors: Kenji Shinozaki, Chiba (JP); Shuji Gomi, Chiba (JP)

(73) Assignee: Showa Denko K.K., Tokyo (JP)

( * ) Notice: Subject to any disclaimer, the term of this patent is extended or adjusted under 35 U.S.C. 154(b) by 295 days.

(21) Appl. No.: 12/526,172

(22) PCT Filed: Feb. 6, 2008

(86) PCT No.: PCT/JP2008/051917
§ 371 (c)(1),
(2), (4) Date: Aug. 6, 2009

(87) PCT Pub. No.: WO2008/096773
PCT Pub. Date: Aug. 14, 2008

(65) Prior Publication Data
US 2010/0321954 A1 Dec. 23, 2010

(30) Foreign Application Priority Data
Feb. 7, 2007 (JP) .................................. 2007-028180

(51) Int. Cl.
*F21V 7/04* (2006.01)
(52) U.S. Cl. ............... 362/612; 362/613; 362/249.02; 362/800
(58) Field of Classification Search ............. 362/612, 362/613, 311.02, 249.02, 800
See application file for complete search history.

(56) References Cited

U.S. PATENT DOCUMENTS

| | | | | |
|---|---|---|---|---|
| 7,278,766 B2 * | 10/2007 | Machi et al. | ........... | 362/470 |
| 7,441,938 B2 * | 10/2008 | Sakai et al. | ........... | 362/634 |
| 7,473,022 B2 * | 1/2009 | Yoo | ........... | 362/621 |
| 2006/0104090 A1 * | 5/2006 | Lengyel et al. | ........... | 362/612 |
| 2006/0274553 A1 * | 12/2006 | Chiu et al. | ........... | 362/613 |
| 2008/0074903 A1 * | 3/2008 | Nam et al. | ........... | 362/613 |
| 2008/0232134 A1 * | 9/2008 | Weng et al. | ........... | 362/612 |
| 2009/0316432 A1 * | 12/2009 | Nittou | ........... | 362/612 |
| 2010/0149834 A1 * | 6/2010 | Kim et al. | ........... | 362/612 |

FOREIGN PATENT DOCUMENTS

| | | |
|---|---|---|
| JP | 06-003527 A | 1/1994 |
| JP | 2001-135118 A | 5/2001 |
| JP | 2003-090993 A | 3/2003 |
| JP | 2005-017964 A | 1/2005 |

* cited by examiner

*Primary Examiner* — Evan Dzierzynski
(74) *Attorney, Agent, or Firm* — Sughrue Mion, PLLC

(57) ABSTRACT

The light emitting module 11 includes: a mount body 20; and a support body 30 supporting the mount body 20. The mount body 20 includes: a circuit board 21 with wirings provided thereon; and a light emitting unit 40 to be mounted on the circuit board 21. The circuit board 21 includes: a base portion 22; and a rising portion 23, with the light emitting unit 40 being attached thereon, rising from one end, in a longitudinal direction, of the base portion 22 through a bending portion 24. The rising portion 23 is divided into seven, first to seventh sidewall portions 23a to 23g with slits 25a to 25f provided at six positions. First to seventh light emitting portions 40a to 40g forming the light emitting unit 40 are attached to the first to seventh sidewall portions 23a to 23g, respectively. Thereby, reduction in thickness of a light emitting device including solid-state light emitting elements is achieved.

12 Claims, 9 Drawing Sheets

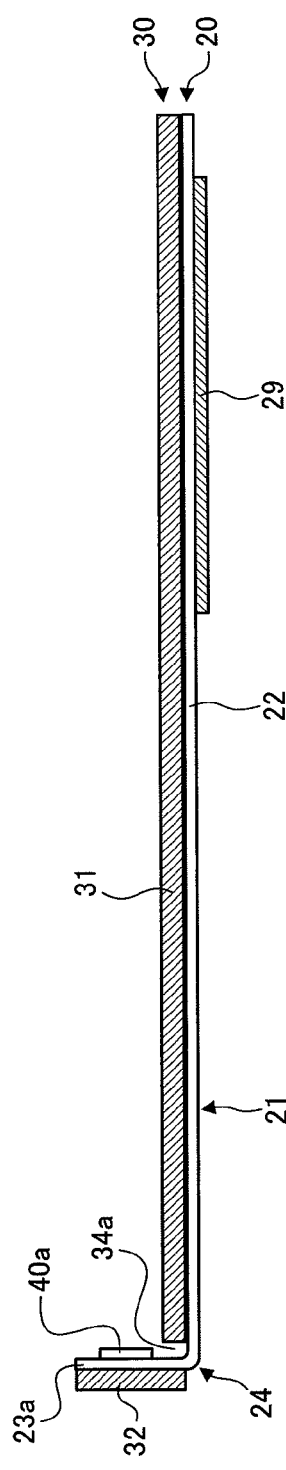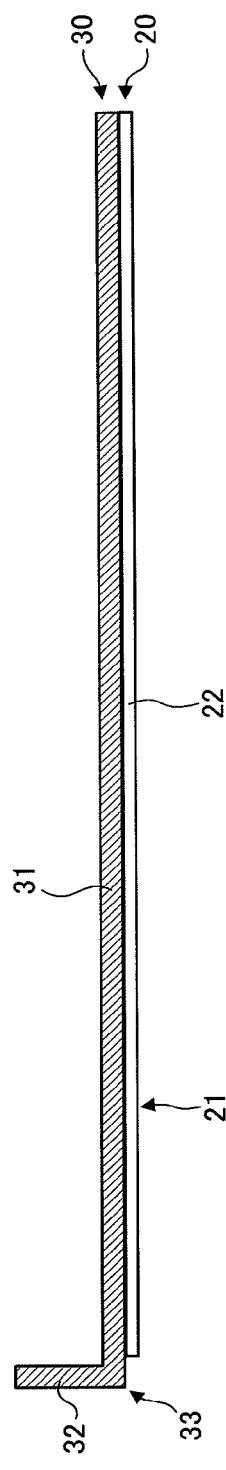

LIGHT EMITTING DEVICE AND SURFACE LIGHT SOURCE DEVICE

TECHNICAL FIELD

The present invention relates to a light emitting device and a surface light source device using solid-state light emitting elements and the like.

BACKGROUND ART

Recently, display devices such as liquid crystal display devices, typified by, for example, a liquid crystal display television and a liquid crystal display monitor, have adopted a backlight device as a light emitting device for emitting light from the back, side or the like of a display panel. As the backlight device, what is called an edge-lighting (a side-lighting) type exists in which a light source is disposed on two or one side of a light guide plate made of transparent resin so that light incident on the light guide plate is reflected by a reflector disposed on the back surface of the light guide plate, thus illuminating the surface of a liquid crystal display panel.

A fluorescent tube such as a hot-cathode fluorescent tube or a cold-cathode fluorescent tube is generally used as the above-mentioned backlight device. On the other hand, technologies of backlight devices using light emitting diodes (LEDs), which are one type of solid-state light emitting elements, as a light source, have been recently developed as a substitute for the backlight devices using the fluorescent tubes. A backlight device with light sources arranged on a side of a light guide plate has been known as a back light device of the side-light type using light emitting diodes (for example, refer to Patent Document 1). The light sources are formed of a substrate on which plural light emitting diodes are mounted.
Patent Document 1: Japanese Patent Application Laid Open Publication No. 6-3527

DISCLOSURE OF THE INVENTION

Problems to be Solved by the Invention

In the above-described backlight device, wirings that respectively connect the light emitting diodes to a power supply are formed on a substrate. Recently, in order to meet demands for larger display panels with higher image quality, the number of light emitting diodes mounted on a substrate has been increasing in particular, and the number of wirings formed in a substrate has also been increasing accordingly. As the number of wirings formed in a substrate thus increases, an area required for routing the wirings increases. Here, a conceivable technique for increasing an area usable for routing the wirings is, for example, to increase the area of the substrate itself, or to increase the number of wiring layers in the substrate.

However, employing the former technique, for example, increases the width of the substrate, that is, the thickness of the backlight device in a direction orthogonal to a surface of a display panel, and consequently increases the thickness of the display device. On the other hand, employing the latter technique, for example, is less likely to cause such a problem of the former technique, indeed. However, the increase in the number of wiring layers leads to an increase in the cost of manufacturing the substrate.

The present invention has been made based on the above-described techniques, and has an object of achieving reduction in thickness of a light emitting device including solid-state light emitting elements.

Means for Solving the Problems

In order to address the above object, a light emitting device to which the present invention is applied includes: a substrate that includes a base portion and plural sidewall portions each rising from one end portion side of the base portion through a bending portion, and on which a wiring is formed; and plural light emitting portions that are attached respectively to inner surfaces of the plural sidewall portions formed by the bending portion, and that are electrically connected to the wiring.

In such a light emitting device, in a case where the plural light emitting portions each include plural solid-state light emitting elements, the plural solid-state light emitting elements are attached to the plural sidewall portions along the bending portion. The light emitting device may further include a support member that collectively supports the plural sidewall portions from opposite surfaces to the surfaces to which the light emitting portions are attached. In this case, the support member includes: amount portion; a support portion that rises from one end portion side of the mount portion through a curving portion; and plural openings that are formed on the one end portion side of the mount portion along the curving portion. Here, the base portion is disposed so as to face one of surfaces of the mount portion, and the plural sidewall portions are disposed so as to penetrate the plural openings and face the other surface of the support portion. Furthermore, the wiring is formed so as to bridge the base portion and the sidewall portions of the substrate.

According to another aspect of the present invention, a light emitting device to which the present invention is applied includes: a substrate that includes a base portion and a rising portion rising from one end portion side of the base portion through a bending portion, and on which a wiring is formed; and plural solid-state light emitting elements that are attached to the rising portion on an inner side of the substrate, and that are electrically connected to the wiring, the inner side formed by the bending portion. Here, the rising portion is divided into plural sidewall portions by at least one slit, and the plural solid-state light emitting elements are divided into plural groups for the respective sidewall portions and attached to the plural sidewall portions.

In such a light emitting device, the plural solid-state light emitting elements include red light emitting elements, green light emitting elements and blue light emitting elements, and the red light emitting elements, the green light emitting elements and the blue light emitting elements are arranged in the same order across the sidewall portions adjacent to each other. The wiring is formed so as to bridge the base portion and the sidewall portions of the substrate.

According to further aspect of the present invention, the present invention provides a surface light source device including: a light guide plate that outputs light entering from a side surface, to an upper surface side; and a light source that emits light from the side surface of the light guide plate to the light guide plate. Here, the light source includes: plural solid-state light emitting elements that are arranged along the side surface of the light guide plate; and a substrate that includes plural holding portions respectively holding the plural solid-state light emitting elements for each of plural groups, and a base portion formed by bending the substrate at the plural holding portions toward the light guide plate, and that is provided with a wiring for supplying power to the plural solid-state light emitting elements.

Such a surface light source device may further include a support member that supports the plural holding portions toward the light guide plate. In this case, the support member includes: a mount portion; a support portion that rises from one end portion side of the mount portion through a curving portion; and plural openings that are formed on the one end portion side of the mount portion along the curving portion. Here, the base portion is disposed so as to face one of surfaces of the mount portion, and the plural holding portions are disposed so as to penetrate the plural openings and face the other surface of the support portion. Moreover, the wiring is formed so as to bridge the base portion and the holding portions of the substrate.

ADVANTAGES OF THE INVENTION

According to the present invention, it is possible to achieve reduction in thickness of a light emitting device including solid-state light emitting elements.

BEST MODES FOR CARRYING OUT THE INVENTION

Hereinafter, a detailed description will be given of a best mode (hereinafter referred to as exemplary embodiment) for carrying out the present invention with reference to the accompanying drawings.

FIG. 1 is a view showing an entire configuration of a liquid crystal display device to which this exemplary embodiment is applied. The liquid crystal display device to which the present exemplary embodiment is applied includes a liquid crystal display module 50 and a backlight device 10 that is provided on a back surface of the liquid crystal display module 50 (a lower side in the FIG. 1). Note that a backlight device 10 of the side-lighting type is used in the present exemplary embodiment.

The backlight device 10, functioning as a surface light emitting device, includes a light emitting module 11, a light guide plate 12, a reflection sheet 13, a diffusion sheet 14, prism sheets 15 and 16, and a diffusion sheet 17.

The light emitting module 11 as a light emitting device or a light source is disposed on a side surface of one side (a long side) of the light guide plate 12 so as to face the side surface. In the present exemplary embodiment, the light emitting module 11 is configured by arranging plural LED chips each of which emits light of one of the colors, red (R), green (G) and blue (B). A configuration of the light emitting module 11 will be described later in detail.

The light guide plate 12 has a rectangular shape corresponding to a liquid crystal panel 51, and is made of, for example, acrylic resin or the like having excellent light transmission properties. On an opposite surface of the light guide plate 12 to a surface facing the liquid crystal display module 50, asperities or reflection dots made of white ink or the like (neither of them are illustrated) are formed.

The reflection sheet 13 is disposed so as to be in close contact with the dotted surface side of the light guide plate 12. The reflection sheet 13 is made of a film in white or a film having metallic sheen.

The diffusion sheet 14 is disposed so as to be in close contact with the surface, opposite to the reflection sheet 13 side, of the light guide plate 12. The diffusion sheet 14 is a film formed of a laminate of optical films, for example.

The prism sheets 15 and 16 are provided on an upper part (a side closer to the liquid crystal display module 50) of the diffusion sheet 14. The prism sheets 15 and 16 are formed of diffraction grating films having directions of diffraction grating orthogonal to each other.

The diffusion sheet 17 is disposed so as to be in contact with an upper surface of the prism sheet 16, to protect the prism sheet 16. Like the diffusion sheet 14, the diffusion sheet 17 is formed of a laminate of optical films, for example.

On the other hand, the liquid crystal display module 50 includes the liquid crystal panel 51 that is configured by two glass substrates sandwiching liquid crystal in between, and polarization plates 52 and 53 for restricting the oscillation of optical wave to a given direction, which are each laminated on each glass substrate of the liquid crystal panel 51. The liquid crystal display device further includes peripheral members (not shown in the figure) such as an LSI (Large Scale Integration) for driving, mounted thereon.

The liquid crystal panel 51 includes various components not shown in the figure. For example, the two glass substrates have display electrodes, active elements such as a thin film transistor (TFT), liquid crystal, a spacer, sealant, an orientation film, a common electrode, a protective film, a color filter, and others, none of which is shown in the figure.

Note that a structural unit of the backlight device 10 is selected in an arbitrary way. For example, a unit including only the light emitting module 11 and the light guide plate 12 may be called the "backlight device (backlight)". The backlight device 10 may be distributed without including the laminated body of the optical compensation sheets such as the reflection sheet 13, the diffusion sheets 14 and 17, and the prism sheets 15 and 16.

Now, operation of the backlight device 10 will be described.

When the LED chips of the colors R, G and B light up in the light emitting module 11, light of the colors R, G and B emitted respectively from the LED chips enters the light guide plate 12 from one side surface thereof. Then, the light guide plate 12 guides the light, guided from the light emitting module 11 into the light guide plate 12, to the entire surfaces of the light guide plate 12 by using total reflection of the material (acrylic resin, for example) forming the light guide plate 12. At this time, light striking the reflection dots provided on the back surface side of the light guide plate 12 changes directions thereof, and light having an angle smaller than a total reflection angle comes out from the front surface (the surface of the diffusion sheet 14 side) of the light guide plate 12. Light not striking the reflection dots of the light guide plate 12 is reflected by the reflection sheet 13, and then reflected by the front surface of the light guide plate 12. Repetition of these allows light to be emitted almost uniformly from the entire front surface of the light guide plate 12. Meanwhile, light of the colors R, G and B is mixed, and thereby emitted as white light.

The light thus emitted from the front surface of the light guide plate 12 is emitted after being made further uniform through dispersion and diffusion by the diffusion sheet 14. Then, the light emitted from the diffusion sheet 14 is concentrated to the front, specifically, the diffusion sheet 17 (the liquid crystal display module 50), by the prism sheets 15 and 16. Thereafter, the light, emitted from the prism sheet 16 and then made further dispersed and diffused by the diffusion sheet 17, is emitted toward the liquid crystal display module 50. Thus, light whitened by sufficient color mixing, having uniform intensity and having enhanced brightness enters the entire surface of the liquid crystal display module 50.

Next, the light emitting module 11 used in the above-described backlight device 10 will be described in detail with reference to FIG. 2 to FIG. 4B.

FIG. 2 shows a perspective view of the light emitting module 11. The light emitting module 11 includes: a mount body 20 on which plural LED chips are mounted; and a support body 30 which supports the mount body 20. FIG. 3 is a perspective view showing a state in which the light emitting module 11 is separated into the mount body 20 and the support body 30. Furthermore, FIG. 4A is a cross-sectional view taken along IVa-IVa of FIG. 2, and FIG. 4B is a cross-sectional view taken along IVb-IVb of FIG. 2.

In the light emitting module 11, the mount body 20 includes: a circuit board 21 on which wirings are formed; and a light emitting unit 40 to be attached to the circuit board 21.

Here, the circuit board 21 includes: a base portion 22 in a rectangular shape; and a rising portion 23 rising upward from one end, extending in a longitudinal direction, of the base portion 22. Between the base portion 22 and the rising portion 23, a bending portion 24 is formed. The rising portion 23 is divided into seven sidewall portions with slits 25a to 25f provided at six positions. In the following description, the sidewall portions will be called a first sidewall portion 23a, a second sidewall portion 23b, a third sidewall portion 23c, a fourth sidewall portion 23d, a fifth sidewall portion 23e, a sixth sidewall portion 23f and a seventh sidewall portion 23g, when needed. In the present exemplary embodiment, the first sidewall portion 23a to the seventh sidewall portion 23g function as plural holding portions.

The light emitting unit 40 includes a first light emitting portion 40a attached to the first sidewall portion 23a, a second light emitting portion 40b attached to the second sidewall portion 23b, a third light emitting portion 40c attached to the third sidewall portion 23c, a fourth light emitting portion 40d attached to the fourth sidewall portion 23d, a fifth light emitting portion 40e attached to the fifth sidewall portion 23e, a sixth light emitting portion 40f attached to the sixth sidewall portion 23f, and a seventh light emitting portion 40g attached to the seventh sidewall portion 23g. The first light emitting portion 40a to the seventh light emitting portion 40g are each formed along the bending portion 24. Moreover, the light emitting unit 40 is attached to a surface, on an inner side of the bending portion 24, of the rising portion 23. Accordingly, the first light emitting portion 40a to the seventh light emitting portion 40g are arranged in a straight line along the bending portion 24. In the following description, a surface of the circuit board 21 on the inner side of the bending portion 24, in other words, a surface on which the light emitting unit 40 is formed, will be called a front surface, and a surface opposite to the front surface will be called a back surface.

Meanwhile, the support body 30, functioning as a support member, includes: a mount portion 31 in a rectangular shape; and a support portion 32 rising upward from one end, extending in a longitudinal direction, of the mount portion 31. Between the mount portion 31 and the support portion 32, a curved portion 33 is formed. In a part, on the curved portion 33 side, of the mount portion 31, seven openings 34a to 34g penetrating the mount portion 31 are formed along the curved portion 33. Note that, in the following description, the openings will be called a first opening 34a, a second opening 34b, a third opening 34c, a fourth opening 34d, a fifth opening 34e, a sixth opening 34f and a seventh opening 34g, when needed. Moreover, in the following description, a surface of the support body 30 on the inner side of the curved portion 33 will be called a front surface, and a surface opposite to the front surface will be called a back surface.

In the light emitting module 11, the back surface of the mount portion 31 of the support body 30 and the front surface of the base portion 22 of the mount body 20 are disposed so as to face each other. Moreover, the first sidewall portion 23a to the seventh sidewall portion 23g (and the first light emitting portion 40a to the seventh light emitting portion 40g attached respectively to the sidewall portions) provided to the mount body 20 penetrate the support body 30 from the back surface side to the front surface side through respectively the first opening 34a to the seventh opening 34g provided in the support body 30. Thereby, the front surface of the support portion 32 of the support body 30 and the back surface of the rising portion 23 (the first sidewall portion 23a to the seventh sidewall portion 23g) of the mount body 20 are disposed so as to face each other. By bonding the front surface of the support portion 32 and the back surface of the rising portion 23 with adhesive, the mount body 20 is fixed to the support body 30. When the mount body 20 is attached to the support body 30, the front surface of the support portion 32 of the support body 30 is exposed, for example, from a space between the first sidewall portion 23a and the second sidewall portion 23b. For this reason, a reflection layer having enhanced light-reflecting properties, made of white resin, for example, is preferably formed on at least this region. The same applies to regions exposed between the second sidewall portion 23b and the third sidewall portion 23c, between the third sidewall portion 23c and the fourth sidewall portion 23d, between the fourth sidewall portion 23d and the fifth sidewall portion 23e, between the fifth sidewall portion 23e and the sixth sidewall portion 23f, and between the sixth sidewall portion 23f and the seventh sidewall portion 23g.

In the light emitting module 11, an upper end position of the rising portion 23 of the mount body 20 and an upper end position of the support portion 32 of the support body 30 are set to be approximately the same position. Here, the height from a front surface position of the mount portion 31 of the support body 30 to the upper end position of the rising portion 23 is set at approximately 2 mm. Furthermore, in the light emitting module 11, side end positions of the base portion 22 of the mount body 20 and side end positions of the mount portion 31 of the support body 30 are set to be approximately the same positions.

In addition, as shown in FIG. 4A, connectors 29 for power supply to the first light emitting portion 40a to the seventh light emitting portion 40g are attached on the back surface of the base portion 22 of the circuit board 21.

Next, a configuration of the light emitting unit 40 will be described. As described above, the light emitting unit 40 is formed of the first light emitting portion 40a to the seventh light emitting portion 40g. Since the first light emitting portion 40a to the seventh light emitting portion 40g have the same basic configuration, a description will be given by taking the first light emitting portion 40a shown in FIG. 5 as an example.

The first light emitting portion 40a includes 15 LED chips 41, a dam 42 and 15 covers 43.

In the first light emitting portion 40a, the 15 LED chips 41, functioning as solid-state light emitting elements, are arranged in a straight line. Moreover, the 15 LED chips 41 are formed of sets of five LED chips 41, each set including the LED chips 41 of red light emitting elements, green light emitting elements or blue light emitting elements. The LED chips 41 are arranged in the order of red (R), green (G) and blue (B) from the left in the figure, specifically, in the order of Ra1, Ga1, Ba1, Ra2, Ga2, Ba2, Ra3, Ga3, Ba3, Ra4, Ga4, Ba4, Ra5, Ga5 and Ba5. The LED chips 41 are attached directly to the circuit board 21. Accordingly, packages for the LED chips 41 are unnecessary in the present exemplary embodiment, thus reducing the manufacturing cost.

The dam 42 has a shape of continuously connecting "∞" in a longitudinal direction thereof, and is formed so as to surround the LED chips 41. The dam 42 may be made of white resin, for example.

The covers 43 are formed so as to fill spaces formed on the LED chips 41 by the dam 42. The covers 43 may be made of resin which is transparent to light with the emission wavelength of the LED chips 41.

FIG. 6 is a view showing an arrangement of all the LED chips 41 to be attached to the light emitting module 11 (mount body 20).

To the first sidewall portion 23a, attached are 15 LED chips 41 (Ra1, Ga1, Ba1, Ra2, Ga2, Ba2, Ra3, Ga3, Ba3, Ra4, Ga4, Ba4, Ra5, Ga5 and Ba5 from the left in the figure) to form the first light emitting portion 40a. To the second sidewall portion 23b, attached are 15 LED chips 41 (Rb1, Gb1, Bb1, Rb2, Gb2, Bb2, Rb3, Gb3, Bb3, Rb4, Gb4, Bb4, Rb5, Gb5 and Bb5 from the left in the figure) to form the second light emitting portion 40b. To the third sidewall portion 23c, attached are 15 LED chips 41 (Rc1, Gc1, Bc1, Rc2, Gc2, Bc2, Rc3, Gc3, Bc3, Rc4, Gc4, Bc4, Rc5, Gc5 and Bc5 from the left in the figure) to form the third light emitting portion 40c. To the fourth sidewall portion 23d, attached are 15 LED chips 41 (Rd1, Gd1, Bd1, Rd2, Gd2, Bd2, Rd3, Gd3, Bd3, Rd4, Gd4, Bd4, Rd5, Gd5 and Bd5 from the left in the figure) to form the fourth light emitting portion 40d. To the fifth sidewall portion 23e, attached are 15 LED chips 41 (Re1, Ge1, Be1, Re2, Ge2, Be2, Re3, Ge3, Be3, Re4, Ge4, Be4, Re5, Ge5 and Be5 from the left in the figure) to form the fifth light emitting portion 40e. To the sixth sidewall portion 23f, attached are 15 LED chips 41 (Rf1, Gf1, Bf1, Rf2, Gf2, Bf2, Rf3, Gf3, Bf3, Rf4, Gf4, Bf4, Rf5, Gf5 and Bf5 from the left in the figure) to form the sixth light emitting portion 40f. To the seventh sidewall portion 23g, attached are the 15 LED chips 41 (Rg1, Gg1, Bg1, Rg2, Gg2, Bg2, Rg3, Gg3, Bg3, Rg4, Gg4, Bg4, Rg5, Gg5 and Bg5 from the left in the figure) to form the seventh light emitting portion 40g.

It is considered that, in the light emitting module 11, the 105 LED chips 41 are divided into groups, each including 15 LED chips 41, for the respective sidewall portions to form the light emitting portions. Moreover, by employing this arrangement, the 105 LED chips 41 are all arranged in the order of red, green and blue even in terms of the light emitting unit 40 as a whole in the present exemplary embodiment.

FIGS. 7A and 7B are views for illustrating the circuit board 21 forming the mount body 20. Here, FIG. 7A is a view showing the front surface of the circuit board 21, and FIG. 7B is a perspective view seeing the back surface through the front surface of the circuit board 21. In this state, the circuit board 21 is not bent. To each of the first sidewall portion 23a to the seventh sidewall portion 23g forming the rising portion 23, a clamp tab 231 is provided. The clamp tabs 231 are used in a process of manufacturing the mount body 20 to be described later, and are eventually cut at a cutting portion 232.

On the front surface and the back surface of the circuit board 21, wirings that electrically connect the LED chips 41 to be mounted later are formed. The wirings formed on the front surface of the circuit board 21 are connected to the wirings formed on the back surface thereof through unillustrated through-holes or bumps. Moreover, on the back surface side of the circuit board 21, a first connector pad 26 and a second connector pad 27 are formed respectively at both side end portions, in the longitudinal direction, of the base portion 22, and are connected respectively to the connectors 29 (see FIG. 4A) supplied with power from the outside. Furthermore, on the front surface of the circuit board 21, each of the first sidewall portion 23a to the seventh sidewall portion 23g is provided with 15 die pads and 30 electrode pads in total. The 15 die pads are used to respectively attach the 15 LED chips 41 thereto directly by soldering, and two electrode pads are provided respectively for both sides of each die pad. Meanwhile, on the back surface of the circuit board 21, each of the first sidewall portion 23a to the seventh sidewall portion 23g is provided with a radiation layer 28 that radiates heat produced at the LED chips 41 mounted on the circuit board 21. The die pads provided on the front surface of the circuit board 21 and the radiation layers 28 provided on the back surface thereof are connected through unillustrated through-holes or bumps.

FIG. 8 is a view for illustrating power supply lines for each of the LED chips 41 mounted on the circuit board 21. Here, the first connector pad 26 includes 15 electrode pads 26a to 26o, and the second connector pad 27 includes 15 electrode pads 27a to 27o. Moreover, as described above, the first sidewall portion 23a to the seventh sidewall portion 23g (the first light emitting portion 40a to the seventh light emitting portion 40g) each include 15 LED chips 41 (red×5, green×5, blue×5).

In the present exemplary embodiment, the 105 LED chips 41 in total are electrically connected by using 15 power supply lines. To each of the power supply lines, seven LED chips 41 of the same color are connected in series. Accordingly, the 15 power supply lines include five lines for red, five lines for green and five lines for blue. In addition, in the present exemplary embodiment, the seven LED chips 41 connected in series by each power supply line are attached respectively to different sidewall portions. For example, the electrode pad 26a of the first connector pad 26 is connected to the electrode pad 27a of the second connector pad 27 through the red LED chip 41 (Ra1) provided on the first sidewall portion 23a (first light emitting portion 40a), the red LED chip 41 (Rb1) provided on the second sidewall portion 23b (second light emitting portion 40b), the red LED chip 41 (Rc1) provided on the third sidewall portion 23c (third light emitting portion 40c), the red LED chip 41 (Rd1) provided on the fourth sidewall portion 23d (fourth light emitting portion 40d), the red LED chip 41 (Re1) provided on the fifth sidewall portion 23e (fifth light emitting portion 40e), the red LED chip 41 (Rf1) provided on the sixth sidewall portion 23f (sixth light emitting portion 40f) and the red LED chip 41 (Rg1) provided on the seventh sidewall portion 23g (seventh light emitting portion 40g). The same applies to the other power supply lines.

Now, a process of manufacturing the light emitting module 11 will be described with reference to FIG. 9.

(Mount Body Manufacturing Process)

First of all, a process of manufacturing the mount body 20 will be described.

First, the circuit board 21 shown in FIGS. 7A and 7B is prepared (Step 11). The circuit board 21 may be formed by a known plated-through-hole method, a bump lamination method or the like. Then, LED chips 41 are mounted on the prepared circuit board 21 (Step 12). In this step, to the die pads provided on the front surfaces of the first sidewall portion 23a to the seventh sidewall portion 23g of the circuit board 21, the 105 LED chips 41 in total, that is, 15 LED chips 41 for each die pad, are connected by die bonding, and then the mounted LED chips and the electrode pads are connected by wire bonding. Thereafter, the dam 42 is formed on the circuit board 21 having all the LED chips 41 mounted thereon, by resin molding (Step 13), and the covers 43 are formed by injecting transparent resin into the dam 42 thus formed (Step 14).

Then, the circuit board 21 having the dam 42 and the covers 43 formed thereon is bent (Step 15). In the bending step, while the clamp tabs 231 provided to the circuit board 21 are clamped and thereby fixed, the circuit board 21 is bent at the bending portion 24 so that a part to which the light emitting unit 40 is to be formed would be the inner side. Subsequently, the connectors 29 are mounted respectively on the first connector pad 26 and the second connector pad 27 provided on the back surface of the circuit board 21 (Step 16). Lastly, the clamp tabs 231 are cut from the bent circuit board 21 at the cutting portion 232 (Step 17). Thus, the mount body 20 is obtained.

(Support Body Manufacturing Process)

Next, a process of manufacturing the support body 30 will be described.

First, a metal plate made of phosphor bronze or aluminum is prepared (Step 21). Then, by a pressing process or the like, the first opening 34a to the seventh opening 34g are formed in the metal plate (Step 22). Thereafter, the metal plate is bent at the curving portion 33 along the first opening 34a to the seventh opening 34g thus formed (Step 23). Thus, the support body 30 is obtained.

(Assembly Process)

Lastly, a process of assembling the light emitting module 11 from the mount body 20 and the support body 30 will be described.

The mount body 20 manufactured through the above-described mount body manufacturing process and the support body 30 manufactured through the above-described support body manufacturing process are prepared, and then the mount body 20 is inserted into the support body 30 (Step 31). At this time, the first sidewall portion 23a to the seventh sidewall portion 23g of the mount body 20, to which the light emitting unit 40 is attached, are attached so as to penetrate the first opening 34a to the seventh opening 34g provided in the support body 30, respectively. Then, the first sidewall portion 23a to the seventh sidewall portion 23g of the mount body 20 are bonded to the support portion 32 of the support body 30 with adhesive (Step 32). Thus, the light emitting module 11 is obtained.

The light emitting module 11 thus obtained is used as a component of the backlight device 10 of the liquid crystal display device shown in FIG. 1, for example. In the backlight device 10, the light emitting module 11 is attached while the mount portion 31 of the support body 30 and the base portion 22 of the mount body 20 are fixed. Thereby, the light emitting unit 40 provided to the light emitting module 11 is aligned so as to face the corresponding side end surface of the light guide plate 12.

As described above, in the present exemplary embodiment, the circuit board 21, on which the light emitting unit 40 including the plural LED chips 41 is mounted, is bent. With this configuration, even when the area required for wiring increases due to an increase in the number of the LED chips 41 to be mounted or formation of a complicated wiring pattern for series-parallel connection, an increase in thickness of the light emitting module 11 in the thickness direction of the backlight device 10 is suppressed while an increase in the number of wiring layers on the circuit board 21 is suppressed. Consequently, reduction in thickness of the backlight device 10 is achieved.

In particular, in the present exemplary embodiment, the rising portion 23, on which the plural (105 in this example) LED chips 41 are mounted, of the circuit board 21 is divided into seven, the first sidewall portion 23a to the seventh sidewall portion 23g, with the plural slits 25a to 25f, and 15 LED chips 41 are mounted on each of the sidewall portions. With this configuration, compared with a case where a bending process is performed without forming any slits, the bending portion 24 is easily formed into a bent shape, and also deformation of the rising portion 23 in the longitudinal direction at the time of bending is suppressed. Consequently, reduction in fluctuations of the direction of light emission by each of the LED chips 41 provided to the light emitting unit 40 is achieved.

Moreover, in the present exemplary embodiment, the light emitting module 11 is configured of: the mount body 20 including the above-described circuit board 21 and light emitting unit 40; and the support body 30 supporting the mount body 20. With this configuration, further reduction in fluctuations of the direction of light emission by each of the LED chips 41 provided to the light emitting unit 40 is achieved. Furthermore, in the present exemplary embodiment, the first opening 34a to the seventh opening 34g corresponding respectively to the first sidewall portion 23a to the seventh sidewall portion 23g of the mount body 20 are formed in the support body 30, and the mount body 20 is supported while the first sidewall portion 23a to the seventh sidewall portion 23g penetrate into the first opening 34a to the seventh opening 34g, respectively. Then, the back surfaces of the first sidewall portion 23a to the seventh sidewall portion 23g of the mount body 20 are bonded and thereby fixed to the support portion 32 of the support body 30. With this configuration, further stabilization of the posture of each of the LED chips 41 in the light emitting unit 40 (the first light emitting portion 40a to the seventh light emitting portion 40g) attached to the first sidewall portion 23a to the seventh sidewall portion 23g is achieved.

In addition, in the present exemplary embodiment, a so-called chip-on-board assembly is employed by which the 105 LED chips 41 are attached directly to the circuit board 21 by soldering. Accordingly, compared with a package mounting assembly in which packages including the LED chips 41 attached thereto are mounted on the circuit board 21, reduction in the manufacturing cost is achieved. Moreover, by employing the chip-on-board assembly, heat produced at the LED chips 41 easily escapes, and reduction in light emitting efficiency of the LED chips 41 due to the heat is suppressed, compared with the package mounting assembly.

However, when the LED chips 41 are directly mounted on the circuit board 21 by employing the chip-on-board assembly, each of the LED chips 41 emits light to a direction orthogonal to the surface of the circuit board 21, and this makes difficult to configure a light emitting module 11 of the side-light type without any modification. For this reason, in the present exemplary embodiment, such a problem is solved by performing a bending process to the circuit board 21. Moreover, in order that the entire rising portion 23 to which the light emitting unit 40 is attached in the longitudinal direction of the circuit board 21 would rise in a direction orthogonal to the base portion 22, the rising portion 23 is divided into the first sidewall portion 23a to the seventh sidewall portion 23g.

Note that, although the light emitting module 11 is configured by arranging the 105 LED chips 41 of the colors R, G and B in the present exemplary embodiment, the number of the LED chips 41 to be mounted on the circuit board 21 may be changed in design as appropriate according to the size of the liquid crystal panel 51, required optical properties and the like, for example. Moreover, although the rising portion 23 of the mount body 20 (circuit board 21) is divided into seven in the exemplary embodiment, the number of divided portions may be changed in design as appropriate.

Furthermore, although an example of applying the light emitting module 11 to the backlight device 10 of the liquid crystal display module 50 has been described in the present exemplary embodiment, application targets of the light emitting module 11 are not limited thereto. The light emitting

BRIEF DESCRIPTION OF THE DRAWINGS

FIG. 4A is a cross-sectional view taken along IVa-IVa of FIG. 2, and FIG. 4B is a cross-sectional view taken along IVb-IVb of FIG. 2;

DESCRIPTION OF REFERENCE NUMERALS AND SIGNS

Figure 1:
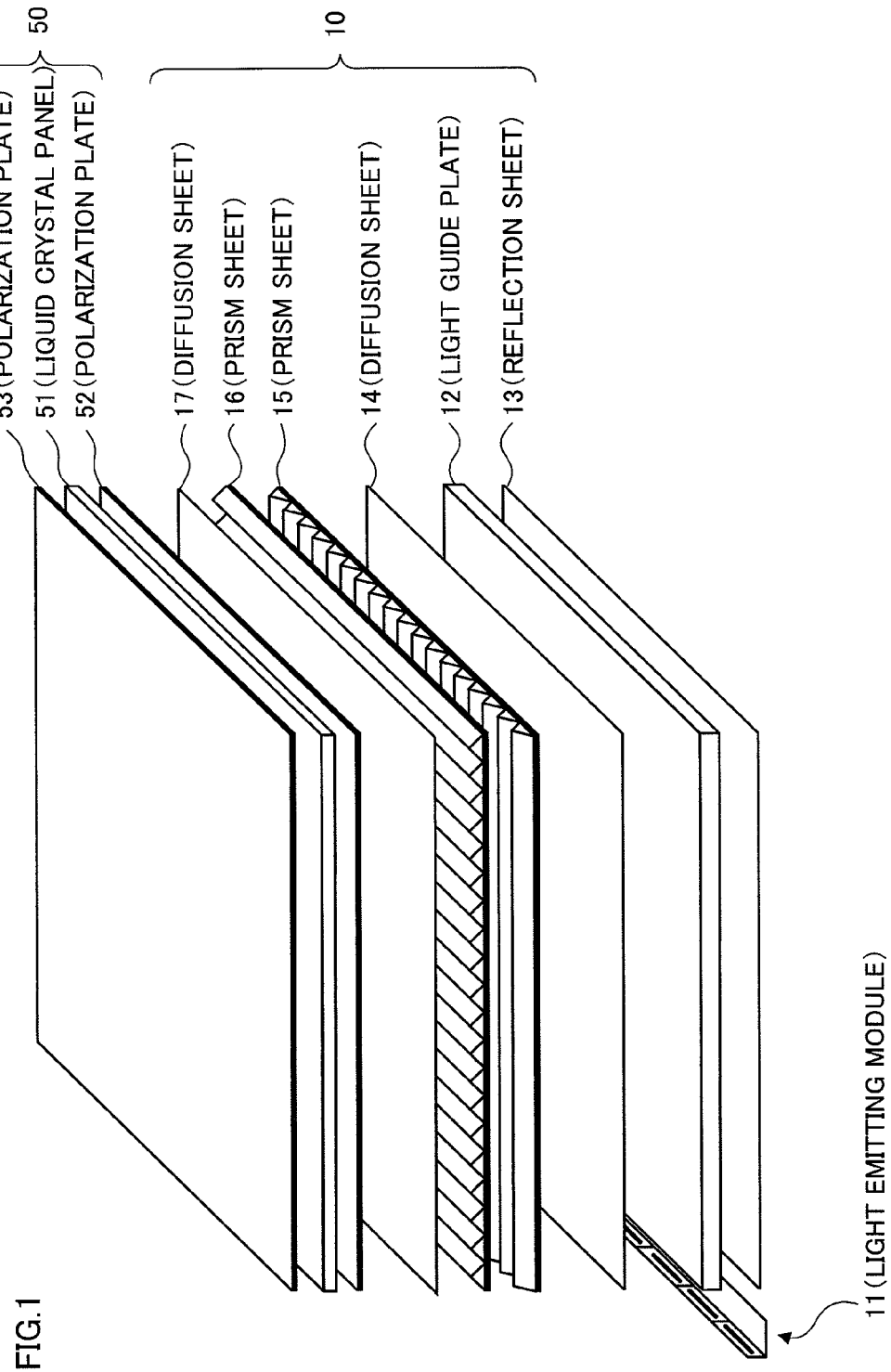
FIG. 1 is a view showing an entire configuration of a liquid crystal display device to which this exemplary embodiment is applied.
Figure 2:
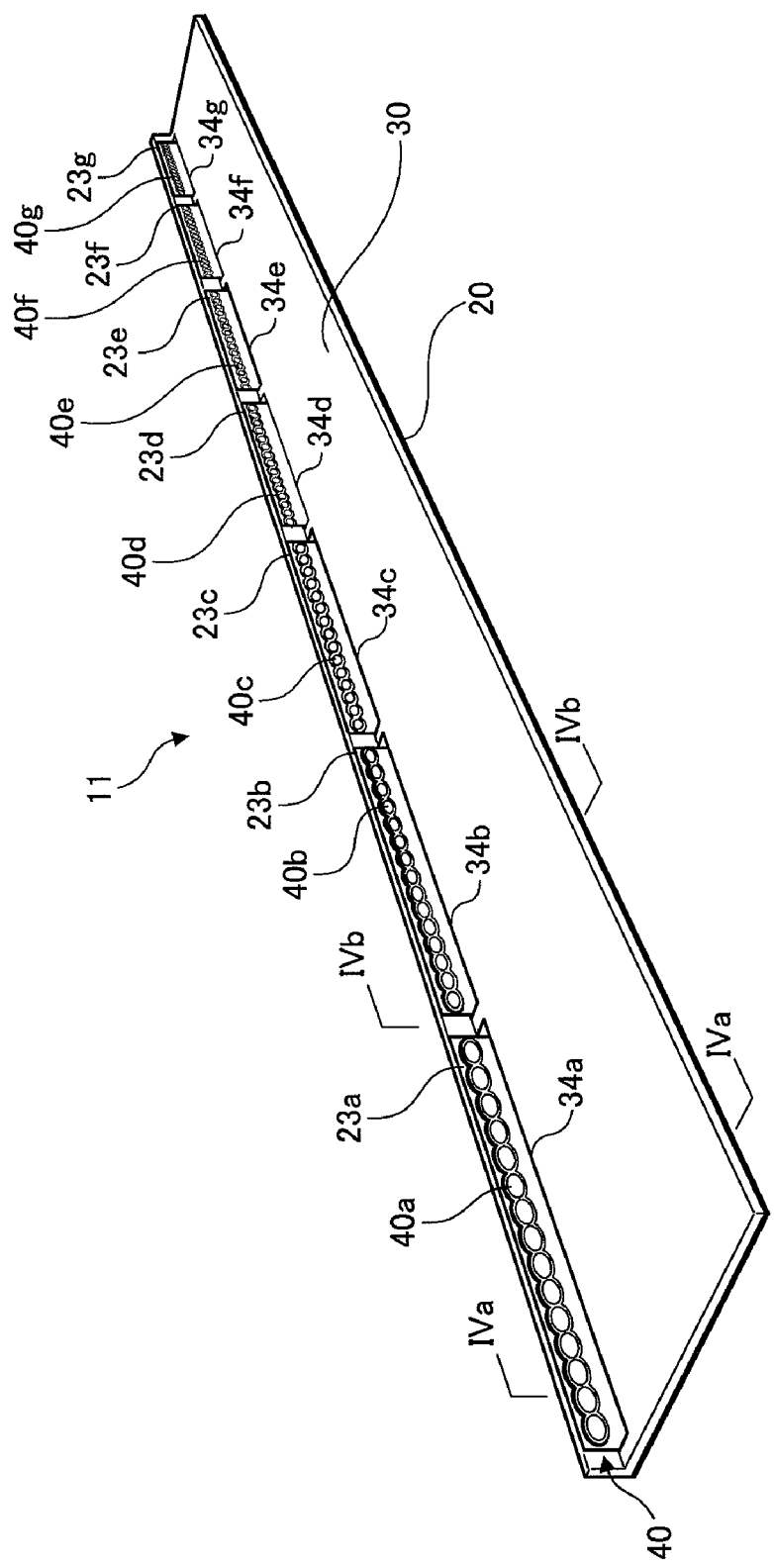
FIG. 2 is a perspective view of the light emitting module.
Figure 3:
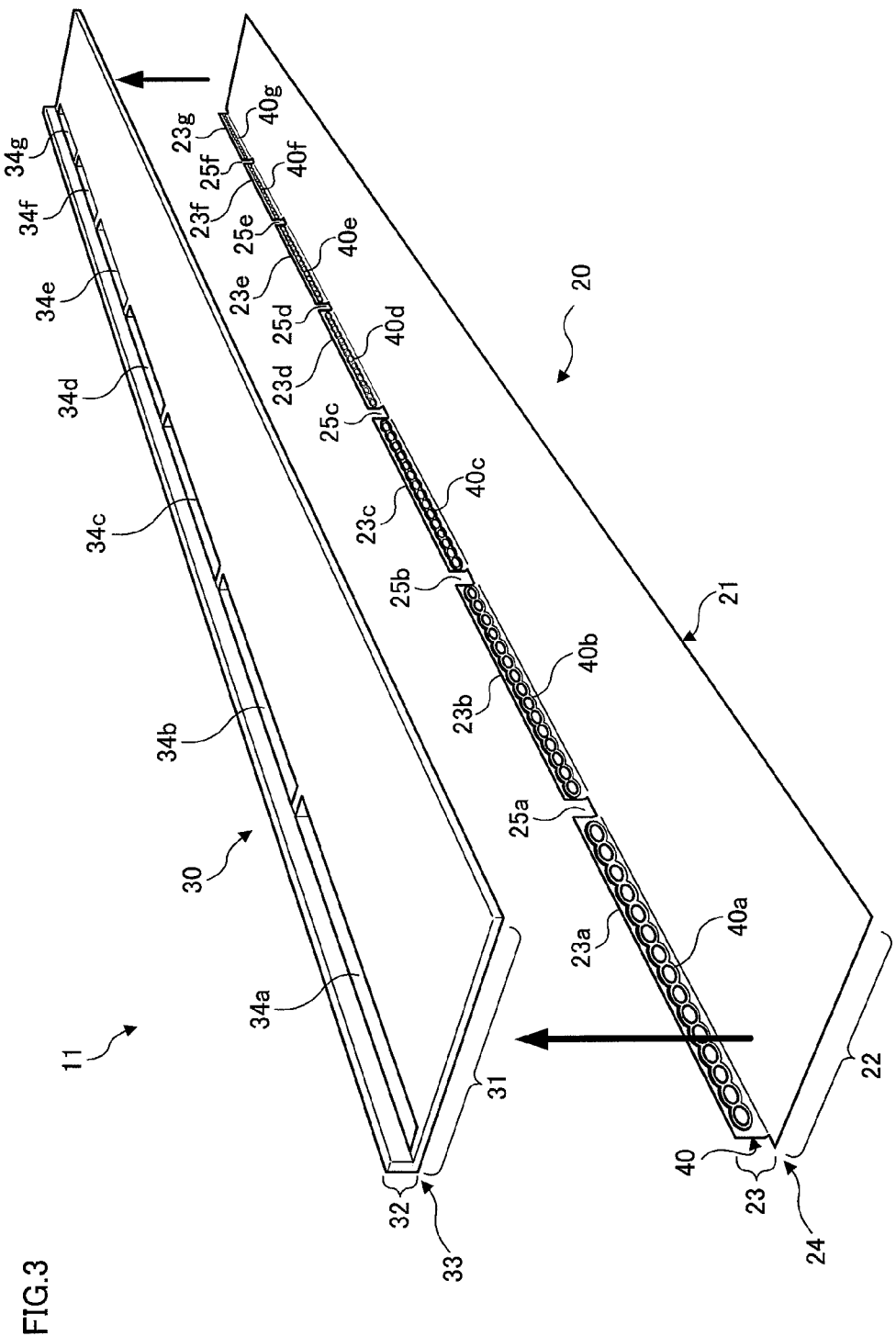
FIG. 3 is a perspective view showing a state in which the light emitting module is separated into the mount body and the support body.
Figure 5:
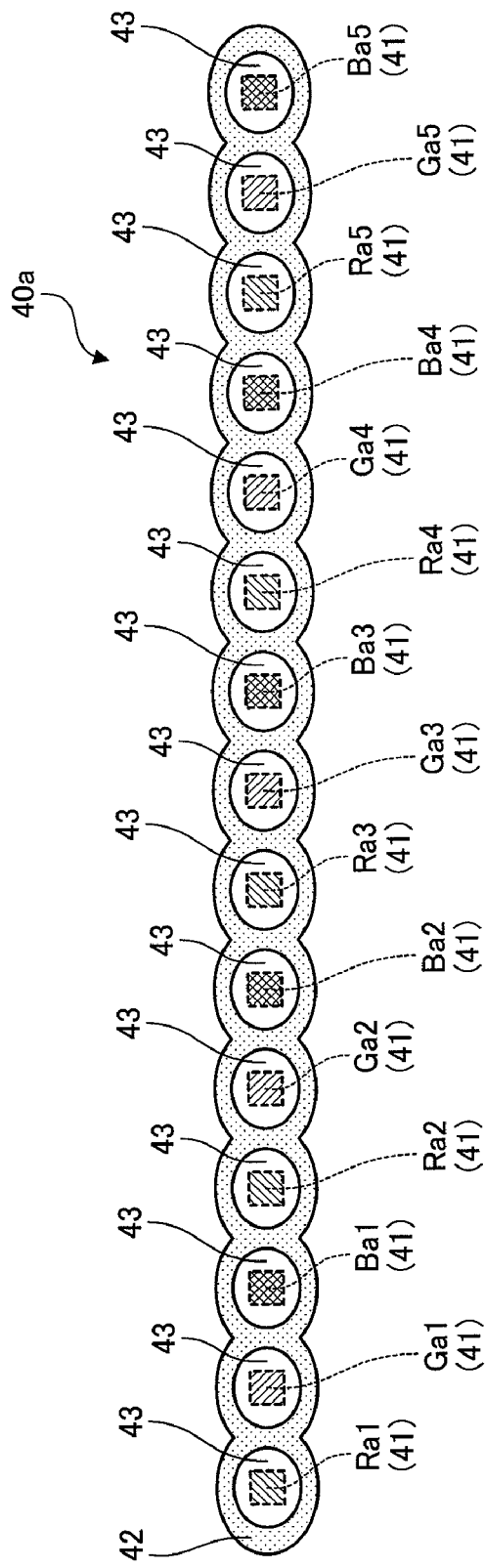
FIG. 5 is a view for illustrating the configuration of the first light emitting portion.
Figure 6:
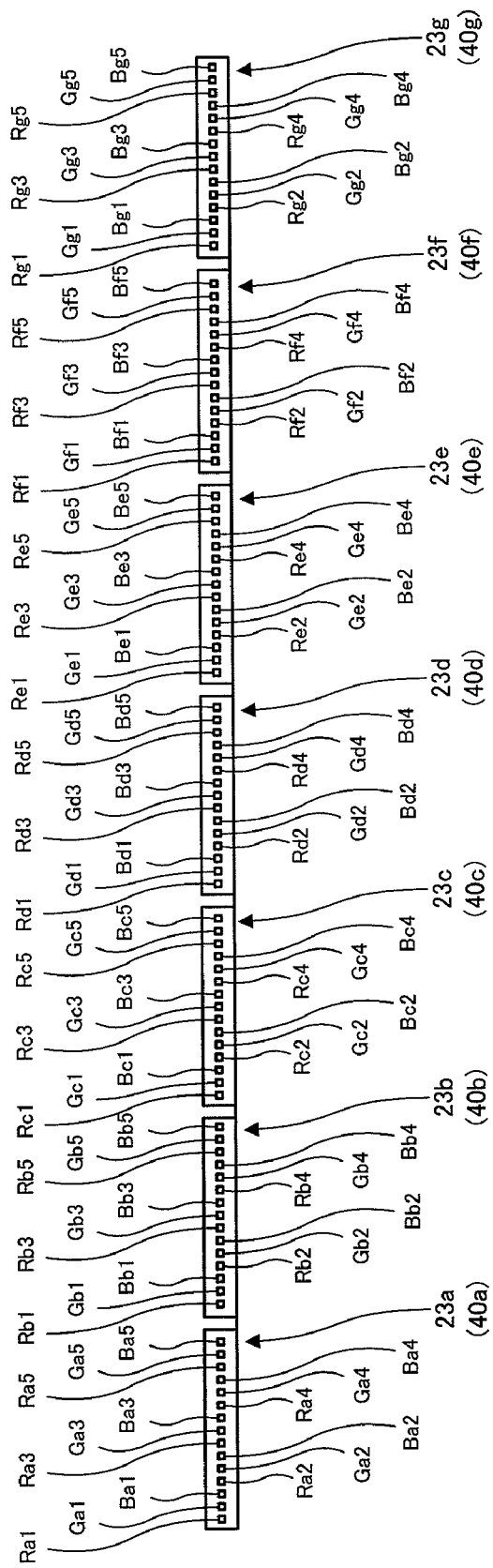
FIG. 6 is a view showing an arrangement of all the LED chips to be attached to the light emitting module.
Figure 7A:
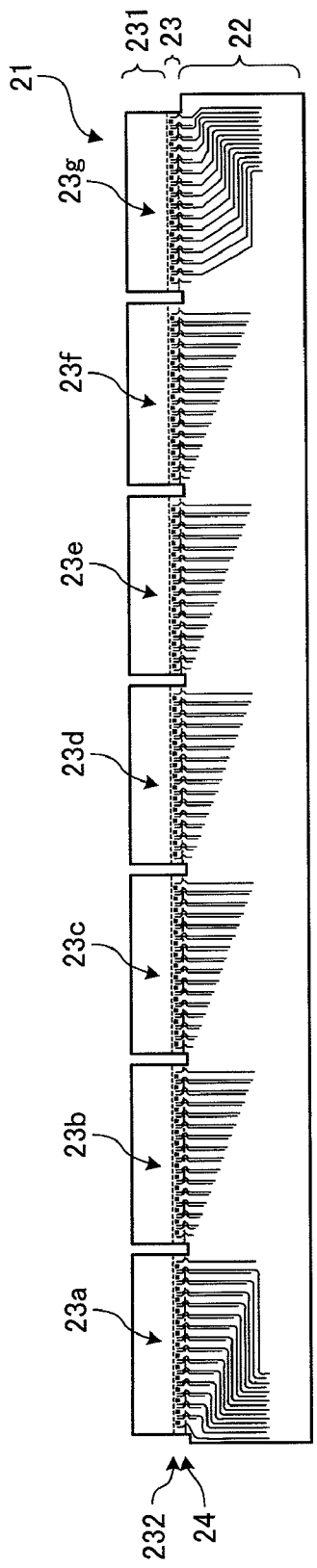
FIG. 7A is a view showing the front surface of the circuit board.
Figure 7B:
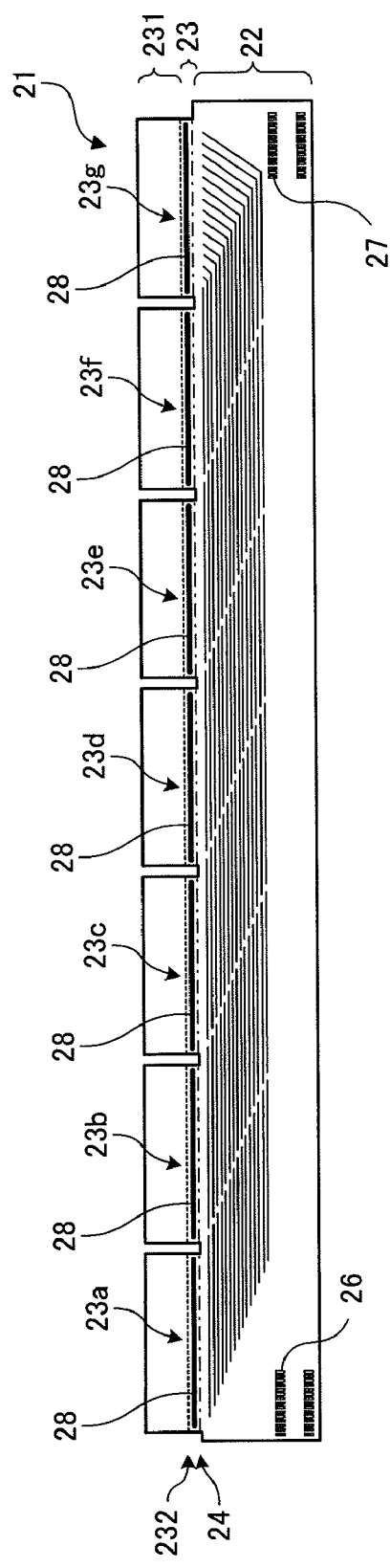
FIG. 7B is a perspective view seeing the back surface through the front surface of the circuit board.
Figure 8:
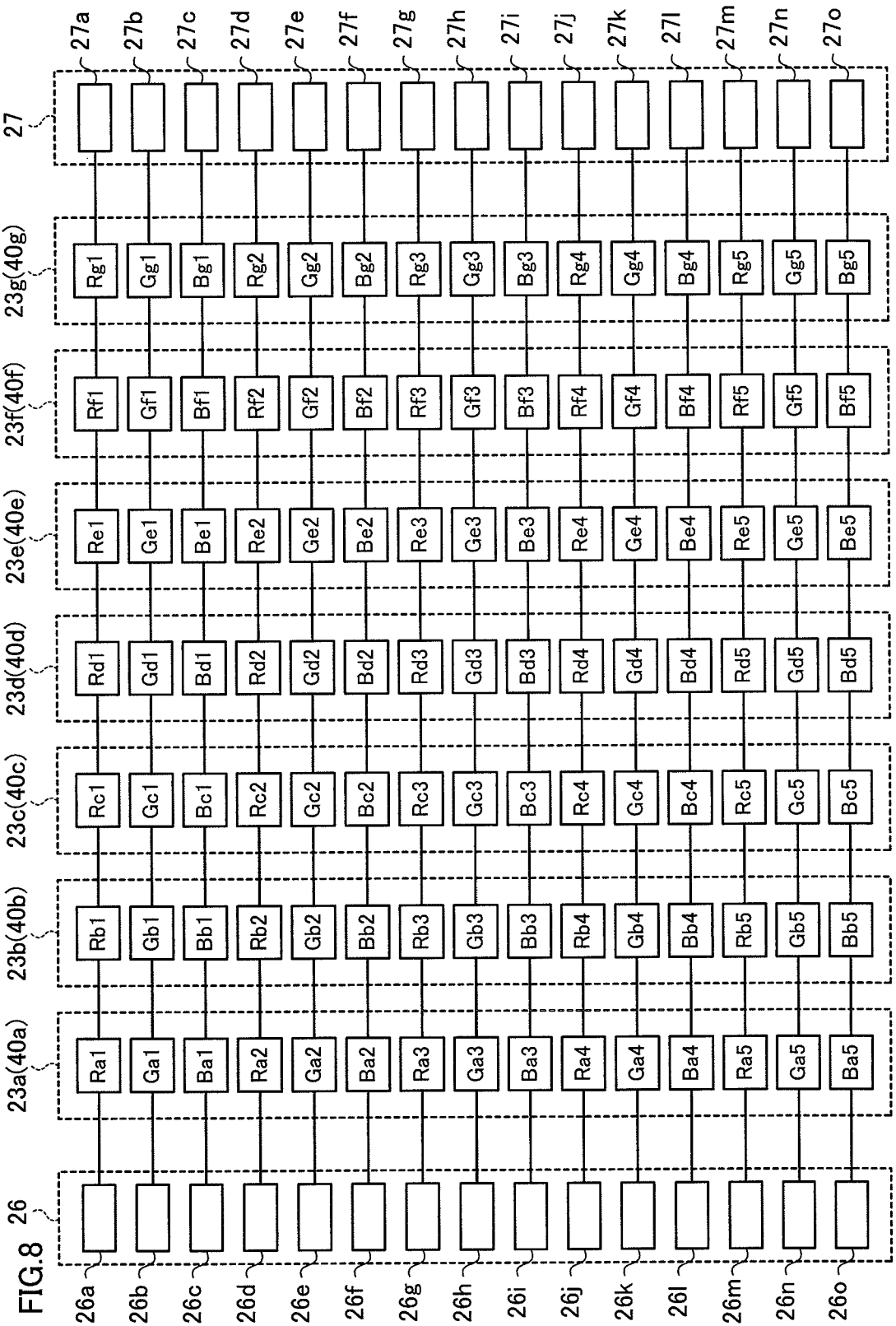
FIG. 8 is a view for illustrating power supply lines for each of the LED chips.
Figure 9:
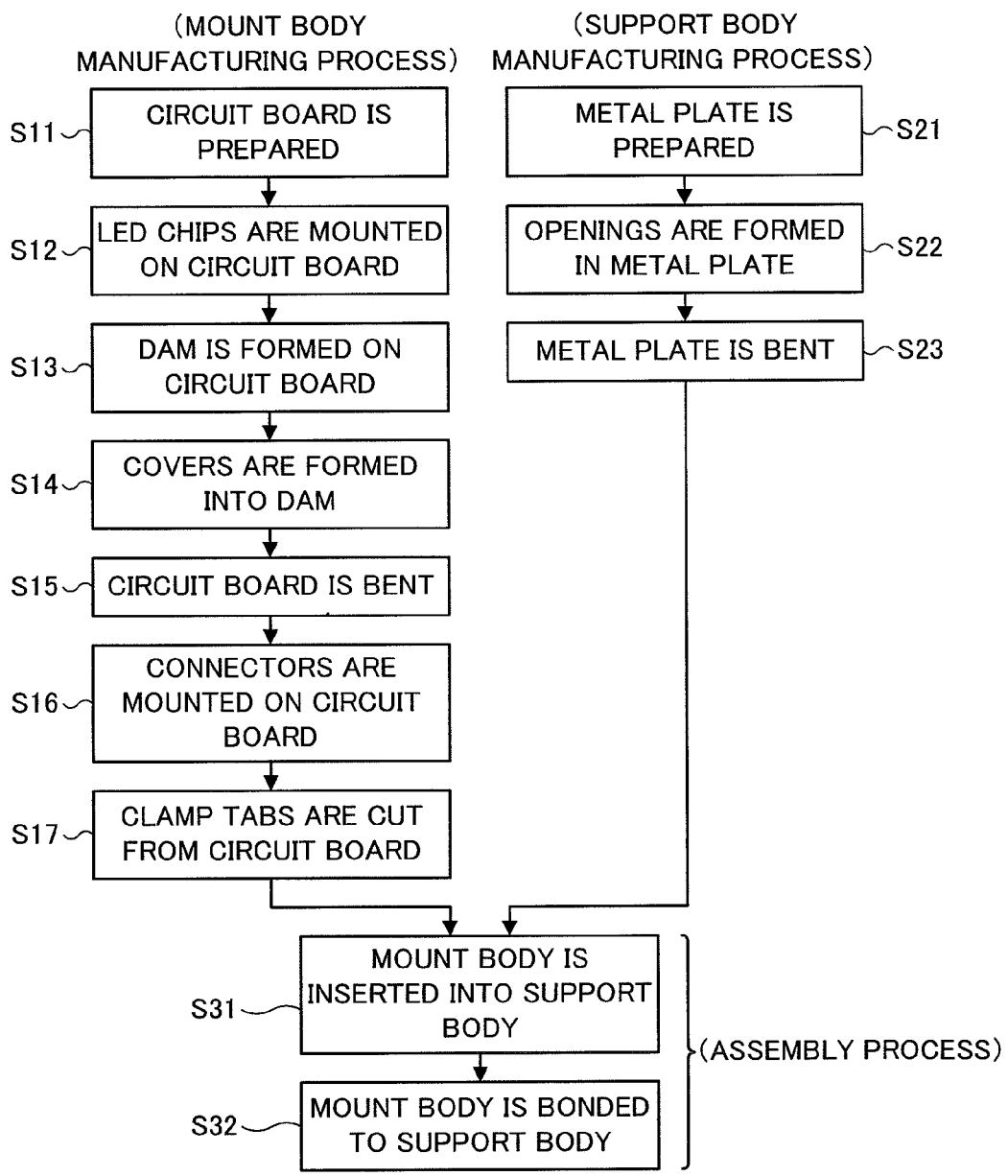
FIG. 9 is a flowchart for explaining a process of manufacturing the light emitting module.

10 ... backlight device, 11 ... light emitting module, 20 ... mount body, 21 ... circuit board, 22 ... base portion, 23 ... rising portion, 23a ... first sidewall portion, 23b ... second sidewall portion, 23c ... third sidewall portion, 23d ... fourth sidewall portion, 23e ... fifth sidewall portion, 23f ... sixth sidewall portion, 23g ... seventh sidewall portion, 24 ... bending portion, 25a to 25f ... slit, 29 ... connector, 30 ... support body, 31 ... mount portion, 32 ... support portion, 33 ... curving portion, 34a ... first opening, 34b ... second opening, 34c ... third opening, 34d ... fourth opening, 34e ... fifth opening, 34f ... sixth opening, 34g ... seventh opening, 40 ... light emitting unit, 40a ... first light emitting portion, 40b ... second light emitting portion, 40c ... third light emitting portion, 40d ... fourth light emitting portion, 40e ... fifth light emitting portion, 40f ... sixth light emitting portion, 40g ... seventh light emitting portion, 41 ... LED chip, 42 ... dam, 43 ... cover, 50 ... liquid crystal display module

The invention claimed is:

1. A light emitting device comprising:
   a substrate that includes a base portion and plurality of sidewall portions each rising from one end portion side of the base portion through a bending portion, and on which a wiring is formed; and
   a plurality of light emitting portions that are attached respectively to inner surfaces of the plurality of sidewall portions formed by the bending portion, and that are electrically connected to the wiring.

2. The light emitting device according to claim 1, wherein the plurality of light emitting portions each include a plurality of solid-state light emitting elements, and
   the plurality of solid-state light emitting elements are attached to the plurality of sidewall portions along the bending portion.

3. The light emitting device according to claim 1, further comprising a support member that collectively supports the plurality of sidewall portions from opposite surfaces to the surfaces to which the light emitting portions are attached.

4. The light emitting device according to claim 3, wherein the support member includes:
   a mount portion;
   a support portion that rises from one end portion side of the mount portion through a curving portion; and
   a plurality of openings that are formed on the one end portion side of the mount portion along the curving portion, wherein
   the base portion is disposed so as to face one of surfaces of the mount portion, and the plurality of sidewall portions are disposed so as to penetrate the plurality of openings and face the other surface of the support portion.

5. The light emitting device according to claim 1, wherein the wiring is formed so as to bridge the base portion and the sidewall portions of the substrate.

6. A light emitting device comprising:
   a substrate that includes a base portion and a rising portion rising from one end portion side of the base portion through a bending portion, and on which a wiring is formed; and
   a plurality of solid-state light emitting elements that are attached to the rising portion on an inner side of the substrate, and that are electrically connected to the wiring, the inner side formed by the bending portion, wherein
   the rising portion is divided into a plurality of sidewall portions by at least one slit, and
   the plurality of solid-state light emitting elements are divided into a plurality of groups for the respective sidewall portions and attached to the plurality of sidewall portions.

7. The light emitting device according to claim 6, wherein the plurality of solid-state light emitting elements include red light emitting elements, green light emitting elements and blue light emitting elements, and
   the red light emitting elements, the green light emitting elements and the blue light emitting elements are arranged in the same order across the sidewall portions adjacent to each other.

8. The light emitting device according to claim 6, wherein the wiring is formed so as to bridge the base portion and the sidewall portions of the substrate.

9. A surface light source device including: a light guide plate that outputs light entering from a side surface, to an upper surface side; and a light source that emits light from the side surface of the light guide plate to the light guide plate, wherein
   the light source comprises:
   a plurality of solid-state light emitting elements that are arranged along the side surface of the light guide plate; and
   a substrate that includes a plurality of holding portions respectively holding the plurality of solid-state light emitting elements for each of a plurality of groups, and a base portion formed by bending the substrate at the plurality of holding portions toward the light guide plate, and that is provided with a wiring for supplying power to the plurality of solid-state light emitting elements.

10. The surface light source device according to claim 9, further comprising a support member that supports the plurality of holding portions toward the light guide plate.

11. The surface light source device according to claim 10, wherein
    the support member includes:

a mount portion;
a support portion that rises from one end portion side of the mount portion through a curving portion; and
a plurality of openings that are formed on the one end portion side of the mount portion along the curving portion, wherein the base portion is disposed so as to face one of surfaces of the mount portion, and the plurality of holding portions are disposed so as to penetrate the plurality of openings and face the other surface of the support portion.

12. The surface light source device according to claim 9, wherein the wiring is formed so as to bridge the base portion and the holding portions of the substrate.

\* \* \* \* \*